United States Patent [19]

Dalaba

[11] Patent Number: 4,703,675
[45] Date of Patent: Nov. 3, 1987

[54] ADJUSTABLE TIRE CHAIN INSTALLER

[76] Inventor: O. Gene Dalaba, 1036 Regent St., Alameda, Calif. 94501

[21] Appl. No.: 893,998

[22] Filed: Aug. 7, 1986

[51] Int. Cl.⁴ .............................................. B60C 27/06
[52] U.S. Cl. ...................................... 81/15.8; 29/429; 29/525; 152/213 R
[58] Field of Search ................. 29/428, 429, 505, 525; 81/15.8; 152/213 R, 230, 213 A

[56] References Cited

U.S. PATENT DOCUMENTS

| | | | |
|---|---|---|---|
| 2,159,626 | 5/1939 | Baycott | 81/15.8 |
| 2,175,395 | 10/1939 | Hewel | 81/15.8 |
| 2,213,910 | 9/1940 | Higgins et al. | 81/15.8 |
| 2,299,185 | 10/1942 | Smola | 81/15.8 |
| 2,576,302 | 11/1951 | Lutz | 81/15.8 |
| 2,665,602 | 1/1954 | Kent | 81/15.8 |
| 3,479,910 | 11/1969 | Jewett | 81/15.8 |
| 3,722,330 | 3/1973 | Smekens | 81/15.8 |

FOREIGN PATENT DOCUMENTS

| | | | |
|---|---|---|---|
| 981808 | 5/1951 | France | 152/213 R |
| 79457 | 5/1949 | Norway | 81/15.8 |

Primary Examiner—Charlie T. Moon
Attorney, Agent, or Firm—Flehr, Hohbach, Test, Albritton & Herbert

[57] ABSTRACT

An adjustable U-shaped wire tire chain installer is disclosed comprising an adjustable width, locking base sections and cradles at the ends of the U-shaped legs which permit easy mounting and removal of tire chains, but prevent accidental removal during use. Alternatively adjustable height legs are incorporated.

10 Claims, 11 Drawing Figures

FIG. 9
REAR WHEEL
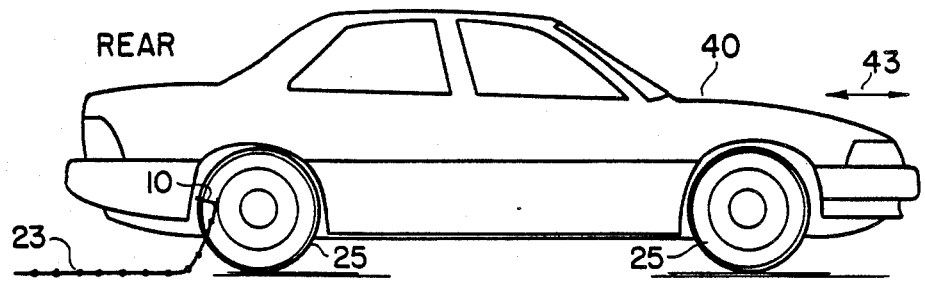
FIG. 10
FRONT WHEEL
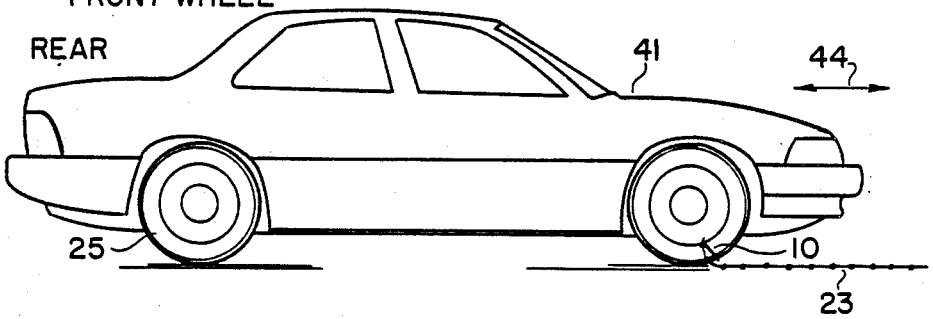
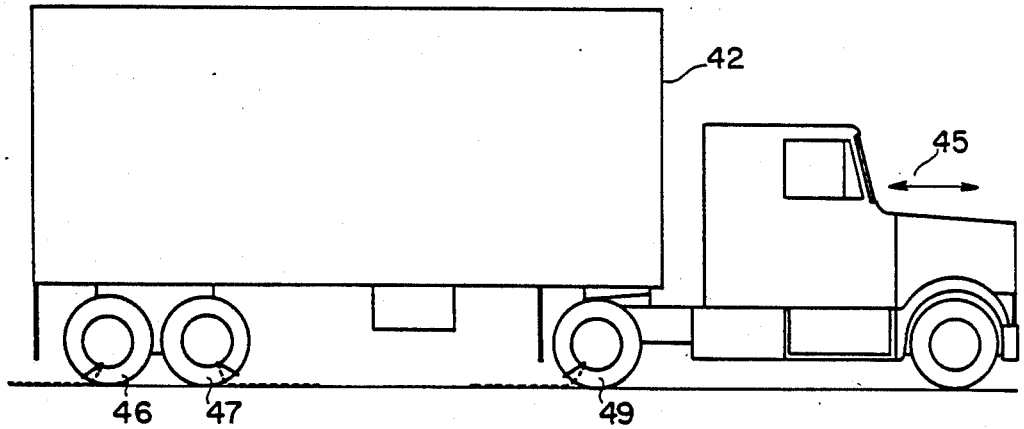
FIG. 11

ADJUSTABLE TIRE CHAIN INSTALLER

BACKGROUND OF THE INVENTION

The present invention relates to tire chain installers In particular, the present invention relates to an adjustable size tire chain installer which can be mounted on essentially any size of vehicular tire. In addition, the invention relates to a tire chain installer which includes improved end hooks or cradles and exerts sufficient gripping force for retaining chains on the installer over 360° rotation. As a result, my tire chain installer readily mounts chains on either or both front and rear tires.

Various configurations of tire chain installers are available in the art. However, many tire chain installers comprise a metal U-shaped body for clamping over the outer transverse circumference of a tire. Typically, these installers include hooks or other fastening devices on the opposite ends of the U-body for retaining the chain while the wheel and installer are positioned on or near the top of the tire and then rotated over the top of the tire to mount the chain. As a group such tire chain installers are limited in terms of the size of tire to which they can be mounted. That is, different size tire chain installers are required to cover the range of tires, for example, from small automobile tires through truck tires.

Also, such tire chain installers typically exert a relatively low gripping force against tires. In addition, the end hooks or other fasteners incorporated in such tire chain installers typically can hold the tire chains only at certain orientations of the tire, for example, with the tire chain installer on top of the tire, but not at the bottom. As a consequence of the low gripping force and of the inability to retain chains at all radial orientations, such tire chain installers have a tendency to drop the chains or to disengage from the tires themselves during rotation. This tendency of the tire chain installer and tire chains to come loose is increased if the chains are mounted by rotating the tire chain installer underneath the tire rather than over the top, because the bottom rotation subjects the installer and chains to additional force between the ground and the moving tire at the most unstable (i.e., bottom) point of the rotation. Over-the-top rotation may be somewhat more successful because the tire chains are partially wrapped around the tire at the time the tire chain installer reaches the bottom of the tire and thus may somewhat counteract the tendency to disengage.

The above-described difficulties in using tire chain installers, particularly where it is desirable or necessary to rotate the tire chain installer beneath the tire, makes such tire chain installers difficult to use in awkward installations and in awkward situations such as bad weather.

One example of a difficult installation involves mounting chains on front wheels, for example, on front wheel drive vehicles. For comparison, consider first the process of mounting chains or rear wheels. Chains usually are mounted on rear wheels by attaching the tire chain installer to the rear side or top of the tire, laying the chains behind the tire and slowing driving forward to rotate the installer and the chains over the top of the tire.

It would be desirable to be able to attach tire chains to front wheels by driving forward. This would involve attaching the tire chain installer to the front or top of the tire, laying the chains so they extend in front of the tire and slowly driving forward over the chains. However, as discussed above, conventional tire chain installers tend to disengage from the tire and/or to drop the tire chains when used in this way. As a result, the use of conventional tire chain installers to mount chains on front wheels requires that the car either be backed up (to rotate the installer over the top of the front wheel) or that the installation be accomplished with the car stationary, that is, by working under the car and, thus, in snow or mud.

SUMMARY OF THE INVENTION

In view of the above discussion, it is one object of my present invention to provide a tire chain installer which is readily adjustable to a wide range of tire sizes.

It is also an object of my present invention to provide a tire chain installer which has improved gripping force and which retains tire chains on the installer regardless of the orientation of the installer and during rotation of the tire. As a result, tire chains can be readily mounted to front as well as rear tires, individually or simultaneously. In addition, tire chains can be mounted readily and even simultaneously on large trucks, including those having front-to-back and/or side-by-side dual wheels.

These and other objects are provided in an adjustable length tire chain installer which comprises a generally U-shaped spring clamp body. A spiral-shaped loop or cradle is formed at each end of the legs of the "U" and defines an entrance for mounting and removing a tire chain, yet provides a complete 360° closure for preventing unwanted disengagement of the chain from the installer. In addition, the U-shaped spring clamp body is formed as two sections which are adjustably joined at the base thereof so that the width of the installer can be adapted to different tire sizes.

In another aspect, the shape and materials of my tire installer chain are selected to optimize the gripping force exerted by the installer against a tire.

In a preferred embodiment, the base of one installer section includes an oval tube and the base of the mating second section comprises a rod having a swedged or flattened end, the long axis of which is oriented generally perpendicular to the long axis of the tube when the legs of the installer are parallel. As a consequence, the installer width is readily adjusted. That is, the two installer sections are rotated so that their respective long axes are parallel, then the tube is moved along the rod so that the installer base is the appropriate length for a particular tire, and the legs are then rotated 90° into the parallel relationship with the long axes perpendicular, to thereby lock the rod within the tube and lock the installer in the desired size.

In still another aspect of my invention, the adjustable length construction is used for the side legs of my tire chain installer to permit variation of the height of the installer, to thereby accommodate different sizes of tires and tire chains.

In still another aspect, my present invention involves a method of mounting tires on the front tires of a vehicle such as an automobile or truck, comprising providing a tire chain installer adapted for retaining tire chains on a tire throughout substantially 360° of rotation, attaching tire chains to the tire using the tire chain installer, laying the chains in front of the tire, and moving the vehicle forward to rotate the tires over the chains to wrap the chains about the tire.

In still another aspect, my present invention relates to a method for mounting tire chains on both the front and rear tires of a vehicle, comprising providing a tire chain installer for the front and rear tires adapted for retaining tire chains on a tire substantially through 360° of tire rotation, attaching tire chains via said tire chain installers to the front and rear tires, laying the chains on said rear wheel behind the rear wheel and the chains on said front wheel in front of the front wheel; and moving the vehicle in a given direction selected from forward and reverse directions to rotate the front and wheel tires and wrap the chains about the respective front and rear tires.

As stated, the approach involves moving the vehicle either forward or backward, as desired or required by the particular circumstances. Depending upon whether the forward or reverse direction of movement is used, the rear or the front tires will have the tire chains rotated over the top whereas the other, front or rear tires, will drive over the tire chains.

BRIEF DESCRIPTION OF THE DRAWINGS

The above and other aspects of the present invention are described with respect to the drawings in which:

FIGS. 9 and 10 depict the use of my tire chain installer to mount tire chains on rear wheel drive and front wheel drive vehicles, respectively; and FIG. 11 depicts the use of my tire chain installer to mount the chains on a truck.

DETAILED DESCRIPTION OF THE INVENTION

Figure 1:
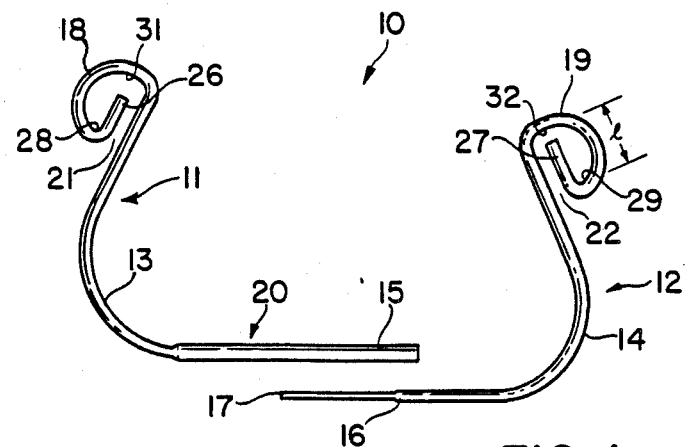
FIG. 1 is a perspective view of a disassembled, adjustable tire chain installer according to a preferred embodiment of my present invention.

FIG. 1 discloses a preferred embodiment 10 of my adjustable tire chain installer. The tire chain installer 10 comprises two sections identified arbitrarily as left section 11 and right section 12. The left section comprises a generally upwardly extending concave leg 13 (as viewed from the inside of the installer), a generally horizontally-extending base member 15, and a spiral-shaped hook or cradle 18 at the upper end of the leg. Similarly, installer right section 12 comprises a generally upwardly extending concave leg 14, a generally horizontally-extending base 16 and a spiral shaped hook or cradle 19 at the upper end of the leg.

Figures 2, 3:
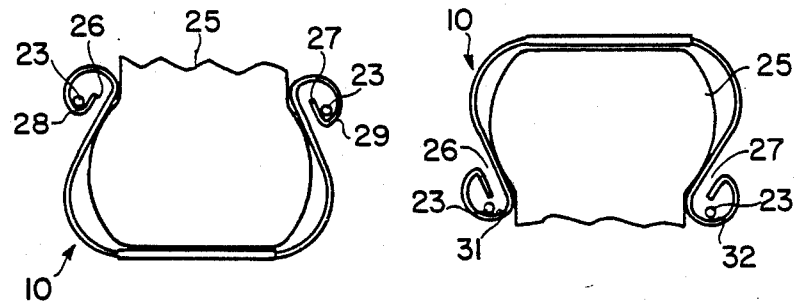
FIGS. 2 and 3 schematically represent the ability of my tire chain installer to securely retain chains in downward and upward orientation, respectively.

Referring further to FIG. 1, the spiral configuration of cradles 18 and 19 define ends 26 and 27 which are spaced slightly from respective legs 13 and 14, thereby defining openings or channels 21 and 22 for attaching tire chains 23, FIGS. 2 and 3. In addition to the openings 21 and 22, and the ease of chain mounting the removal which is provided thereby, the spaced, spiral configuration of the cradle also provides a 360° barrier to removal of the chains. As a result, when the tire chain installer 10 is positioned near the bottom of a tire 25 oriented vertically, as shown in FIG. 2, the tire chains 23 are firmly retained within the small U-shaped hook regions 28 and 29 adjacent the ends 26 and 27. When the tire chain installer is near the top of the tire, as shown in FIG. 3, the tire chains 23 shift along ends 26 and 27 to the U-shaped hook regions 31 and 32 adjacent the legs 13 and 14 and are again retained securely within the installer.

Thus, as a result of the spiral shape of the cradle 18, tire chains are maintained within region 28 and 31 of cradle 18 (and within regions 29 and 32 of cradle 19) during rotation of the tire and installation of the chain and, in general, for all 360° orientations of the installer 10 on a tire. In addition, deliberate removal is easily accomplished by sliding the chain along end 27 (FIG. 1) and out the channel 22.

Figures 4, 5:
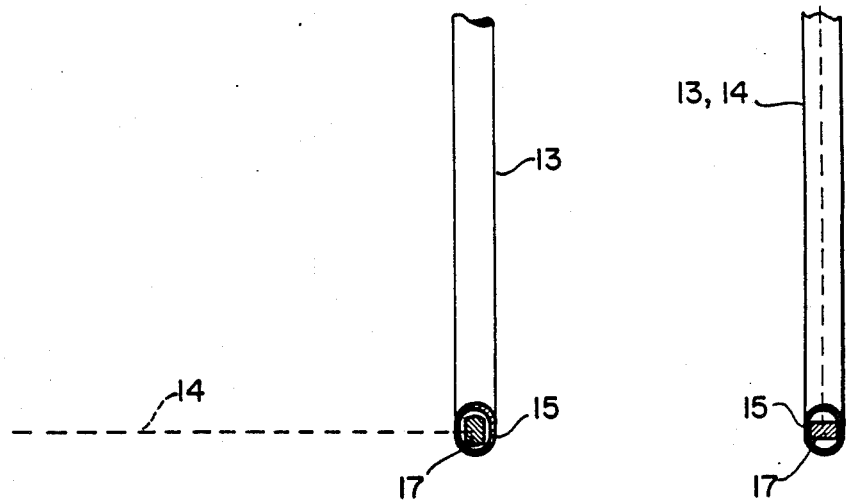
FIG. 4 is a vertical cross-sectional view, in schematic form, taken through the base of the assembled installer when the legs are angled at 90° to permit adjustment of the size of the installer.
FIG. 5 is a vertical cross-sectional view, in schematic form, through the base taken with the legs parallel and the base sections locked.

A second advantageous feature involves the locking adjustable size which is provided by the cooperating base sections 15 and 16, FIG. 1. In a preferred embodiment, base 15 comprises a tube which is joined to the lower end of leg 13 by soldering, welding or other conventional methods. Referring also to FIGS. 4 and 5, tube 15 has an oval transverse configurations, with the long axis of the oval lying, for example, parallel to the length of the leg 13. Base 16 is flattened at end 17 so that the long axis of the flat end is perpendicular to leg 14.

Referring further to FIGS. 1 and 4 and also to FIG. 5, because of the above-described shapes and angular orientations of tube 15 and base end 17, the width of the tire chain installer is readily altered, yet just as readily locked into position. That is, and referring to FIG. 4, when the rod-shaped base 16 of right-hand section 12 is inserted into the tubular base 15 of left-hand section 11 and the legs 13 and 14 are oriented at 90°, the long axes of the base end 17 and the base tube 15 are parallel. As a result, the tube 15 slides easily along the base 16 and end 17 to adjust the width of the tire chain installer. Once the desired width is achieved, the legs 13 and 14 are rotated into the parallel position shown in FIG. 5, thereby orienting the long axes of the tube 15 and base end 17 at 90° and firmly locking the base end 17 within the tube 15 by friction. The tire chain installer 10 is now locked at the desired width with the legs parallel, in the proper orientation for attachment to a tire such as 25. Adjustment to a different width simply requires rotating the legs to a 90° orientation (FIG. 4), sliding the tube 15 along the base 16 and then returning the legs to the parallel orientation (FIG. 5) to lock the installer at the desired width, ready for mounting on a different size of tire.

Figure 6:
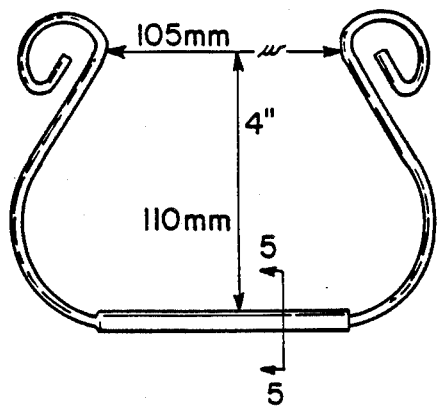
FIGS. 6 and 7 depict the tire chain installer of FIG. 1 assembled and locked to provide a relatively narrow installer and a relatively wide installer, respectively.

FIG. 6 shows a universal automobile size embodiment of my tire chain installer 10, fully assembled and fully contracted so that the gap or width, w, between the two cradles 18 and 19 is about 105 millimeters. Since the smallest conventional automobile tire is about P145 (145 millimeters in width), this allows considerable deformation of the resilient installer 10 in mounting on the tire, and thereby provides good tension on the tire chains for holding the chains while they are being pulled around the tire.

Figure 7:
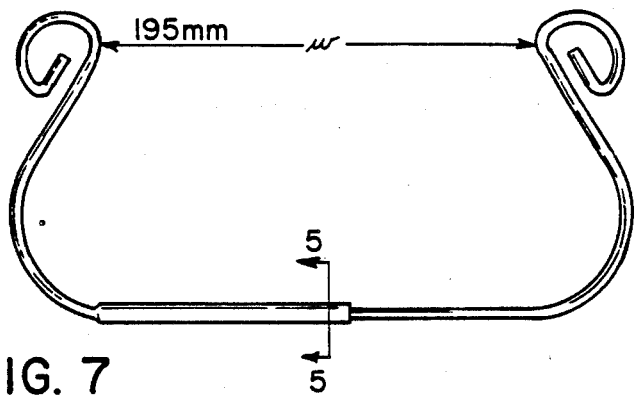

FIG. 7 shows my tire chain installer 10 of FIG. 6, fully extended, with the width, w, between the two cradles approximately 190 millimeters. Because of this adjustability and the deformability of the spring wire, the particular installer 10 can be used to accommodate the largest conventional automobile tire now available, P255 (approximately 250 millimeters wide). In addition, by increasing its dimensions, the tire chain installer 10 can be used for even the largest trucks.

Figure 8:
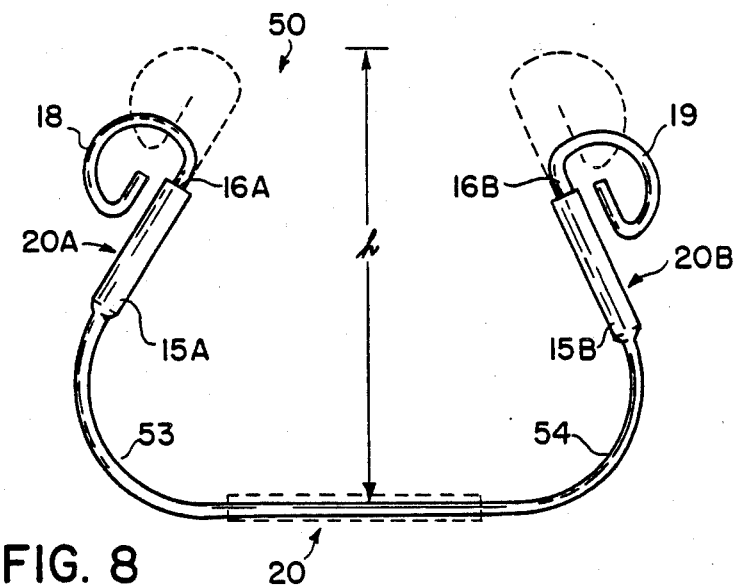
FIG. 8 depicts an alternative embodiment of my adjustable tire chain installer incorporating adjustable length sides or legs.

FIG. 8 depicts an alternative embodiment 50 of my wire chain installer which incorporates adjustable height sections 20A and 20B in the respective legs. Of course, the adjustable height sections can be incorporated alone or in combination with the variable width base section 20, which is shown in phantom in FIG. 8. Each adjustable length leg section 20A (20B) can be constructed essentially identically to adjustable length base section 20, for example, by joining an oval-shaped tube 15A (15B) to the curved lower leg section 53 (54) and providing a mating, swedged end rod 16A (16B) joined to the cradle 18 (19). The adjustable length leg sections 20A and 20B permit varying the height, h, of the tire chain installer 50 as indicated in phantom in the figure. The purpose of adjusting the height is to accommodate tire profiles of different heights as well as chain connecting links of different lengths.

As described at length above, the cradles 18 and 19 are designed so that they can be installed on a tire in any position and without the end lengths of the tire chains that are hooked onto the installer cradles falling off. In addition, a large tire gripping force is provided by the concave-shaped legs 13 and 14°, by the use of a very strong, flexible deformable material such as spring steel (described further below) in the legs; and by the adjustable width of the installer which permits adjusting the tire chain installer to a width which is slightly less than the width of the associated tire, to thereby increase the deformation of the tire chain installer and the compressive force exerted against the tire. In combination, the orientation insensitive cradles and the increased gripping force make my tire chain installer 10 equally effective for mounting chains on front wheels such as on front wheel drive vehicles (or simply from the front side of wheels) and on rear wheels (or from the rear side of wheels).

To illustrate, and referring to FIG. 9, for rear wheel drive automobiles 40, the chains 23 are laid behind the rear tires and the installer 10 is mounted on the tire at an orientation of about nine o'clock. Then, by driving forward(see arrow 43), the chains are pulled up and over the tire and back under to completely encircle the tires. The installer 10 can then be removed and the chain ends locked together. While this rear wheel drive mounting sequence is conventional, the results are not conventional, for the installer 10 and chains 23 are secured to the tire without slipping while the installer and chains are rotated about the tire.

Referring to FIG. 10, for front wheel drive vehicles 41, the chains 23 are laid down in front of the front tires, to extend toward the front of the vehicle, and the installer 10 is mounted onto the front tire at an orientation of approximately five to six o'clock. In this position, the cradles 18 and 19 uniquely prevent the chains from falling off the installer 10. The driver then simply drives forward (see arrow 44) over the chains 23 so that the chains come up under the tire and back over the tire until the installer 10 and the chains are returned to the original position. Since it is generally considered safer to drive forward then to back up, especially in inclement weather, the ability to mount chains by driving forward is an additional safety feature for front wheel drive automobiles. Nonetheless as indicated by arrows 43 and 44 in FIGS. 9 and 10, both front and rear wheel claims may be mounted by driving forward or backward.

FIG. 11 shows an approach for using my tire chain installers 10 or 50 to simultaneously install chains on the tires of a truck. As shown, where access is difficult the tires can be laid out in either a forward or a rearward direction to accommodate the easier access. Thus, for dual front-to-back tires such as the two rear-most tires 46 and 47, one chain can be laid out to the rear and the other to the front. As indicated by arrow 45, preferably the truck is then driven forward so that, in the particular example, rear-most tires 46, 48 and 49 rotate the chain over the top of the wheel in the manner described in detail regarding FIG. 9, whereas tire 47 rotates the chain under the tire and drives over the chain. Of course, various other combinations of over-the-top and bottom rotation can be used. In addition, chains can be mounted simultaneously on both the front and rear wheels of automobiles using the same technique. EXAMPLES In a presently preferred working embodiment of my adjustable tire chain installer 10, designed for automobiles and light trucks, the legs 13 and 14, cradles 18 and 19 and the base 16 and flattened end 17 were formed of music spring carbon steel wire, Federal Specification QQ-W-470b of Dec. 14, 1965. The diameter of this wire or rod was approximately 0.148 inches. The particular wire is very high quality spring wire and provides both "stretching" or deformability, and maximum recoverability. That is, the material returns to its original position even after it has been used a large number of times. This flexibility and recoverability is important in providing the necessary grip on tires in order to pull chains over and under without falling off. Tubular base 15 was formed of cold drawn steel tubing, DOM, of one-quarter inch outside diameter with a wall thickness of 0.035 inch. These dimensions are important in conjunction with the above dimensions of the wire for providing the locking mechanism. Tubular base 15 was pressed from a circle into the oval shape shown in FIGS. 4 and 5, using several tons pressure. Base end 17 was also put in a heavy press and flattened into a swedged shape 17 shown in FIGS. 4 and 5. The combination of this swedged end 17 and the oval shape of the tube 15 provides the locking mechanism which allows my installer 10 to be readily adjusted in size, yet firmly locked into position once a size is selected.

Adjustable tire chain installers as described here have been used successfully for both front and rear tire installations and for a number of different tire sizes, using both over-the-top and under-the-bottom rotation.

It should be mentioned that where adjustability is not required for automobile or truck tires, the configuration of my tire chain installer, including that of the cradles 18 and 19, and the materials described here or equivalent materials can still be used to provide the high gripping force and orientation-independent chain retention features. Thus, non-adjustable tire chain installers which employ the above described gripping and orientation independent characteristics have been used successfully for car, light truck and heavy tractor-trailer truck installations. In the case of the large tractor-trailer trucks, chains can weight about 90 pounds (as opposed to approximately 15 pounds for automobile chains). The primary difference required to accommodate the additional stress caused by this weight is to increase the dimension of the wire used in the chain. By way of illustration, the type of wire described in the Examples has been used, with a diameter of about 0.217 inches.

Thus, there has been described an improved tire chain installer which is of adjustable length for mounting on essentially any size automobile or truck tire or the like, has an improved cradle design for maintaining chains on a tire through 360° of tire rotation, affords substantially equal ease of mounting chains on front wheel drive and rear wheel drive vehicles, and combines these improved qualities of universality and secure mounting with simplicity and ease of use.

Having, thus, described preferred and alternative embodiments of my present invention, it is understood that other embodiments and modifications of the present invention will be readily devised by those of ordinary skill in the art and will be within the scope of the appended claims. For example, other installer dimensions including wire diameters will be readily devised in addition to the specific examples given here.

I claim:

1. An adjustable U-shaped tire chain installer, comprising:
   (a) first and second rod-like leg section means, each leg means comprising a generally concave, upwardextending leg; said leg having a spiral cradle at the upper end defining an opening for attaching and removing tire chains and also defining upper and lower inner hook regions for holding tire chains; and generally transverse horizontally-extending base members;
   (b) the base member of the first section comprising a tube having an oval transverse cross-section defining a major axis parallel to the transverse direction of elongation of the oval;
   (c) the base member of the second section comprising a bar having an end of transverse elongated cross-section defining a major axis parallel to the transverse direction of elongation of the bar; and
   (d) the size of said tube and said bar permitting sliding of said bar within said tube when said axes are parallel, and when the legs are parallel, said axes being oriented at an angle of approximately 90° for locking said bar within said tube and preventing said sliding movement.

2. The adjustable tire chain installer of claim 1 wherein the legs, cradles and bar comprise spring wire and wherein the tube comprises steel tubing.

3. The adjustable tire chain installer of claim 1 wherein the legs, cradles and bar comprise music spring carbon steel wire and wherein the tube comprises cold drawn steel tubing.

4. The adjustable tire chain installer of claim 2 wherein the legs, cradles and the bar are approximately 0.15 inch in diameter and the tube approximately 0.25 inches in outer diameter with a wall thickness of approximately 0.035 inches.

5. The adjustable tire chain installer of claim 4 wherein the width of the tire chain installer, as measured between the two cradles, is adjustable from about 145 to 190 millimeters.

6. The adjustable tire chain installer of claim 1 wherein each leg of the first and second leg means is separated into first and second intermediate ends, one of the said first and second ends having a tube joined thereto having an oval transverse cross-section defining an axis generally parallel to the leg, and the other of the said first and second ends having a transverse elongated cross-section defining an axis parallel to the length of the elongation, the size of said tube and said bar permitting sliding of said bar within said tube when said axes are parallel and when the legs are parallel, said axes being oriented at an angle of approximately 90° for locking said bar within said tube and thereby preventing said sliding movement.

7. The adjustable tire chain installer of claim 6 wherein the legs, cradles and bar comprise spring wire and wherein the tube comprises steel tubing.

8. The adjustable tire chain installer of claim 6 wherein the legs, cradles and bar comprise music spring carbon steel wire and wherein the tube comprises cold drawn steel tubing.

9. The adjustable tire chain installer of claim 7 wherein the legs, cradles and the bar are approximately 0.15 inch in diameter and the tube approximately 0.25 inches in outer diameter with a wall thickness of approximately 0.035 inches.

10. The adjustable tire chain installer of claim 7 wherein the width of the tire chain installer, measured between the two cradles, is adjustable from about 145 to 190 millimeters.

* * * * *